Jan. 19, 1960　　　R. W. KETCHLEDGE　　　2,922,100
WAVE ENERGY TRANSLATING SYSTEM
Filed Dec. 28, 1944

INVENTOR
R.W. KETCHLEDGE
BY
Walter C. Kiesel
ATTORNEY

United States Patent Office 2,922,100
Patented Jan. 19, 1960

2,922,100

WAVE ENERGY TRANSLATING SYSTEM

Raymond W. Ketchledge, Jamaica, N.Y., assignor to Bell Telephone Laboratories, Incorporated, New York, N.Y., a corporation of New York Application December 28, 1944, Serial No. 570,179

10 Claims. (Cl. 318—489)

This invention relates to wave energy translating systems and more particularly to steering systems responsive to radiant energy emanating from a target for guiding a moving body, such as an aerial bomb, to the target.

One general object of this invention is to resolve wave energy emanating from an object and detected at a body or point removed from the object into a signal related to the direction of the object with respect to the body or point.

Another and more specific object of this invention is to realize accurate guidance of an aerial bomb to a target in accordance with information derived from energy, such as heat, emanating from the target.

A further object of this invention is to simplify radiant energy responsive translating systems such as steering systems for moving bodies.

In one illustrative embodiment of this invention, a radiant energy responsive steering system for an aerial bomb comprises a pair of wave energy translating systems each of which is adapted to effect steering of the bomb in a corresponding one of two mutually perpendicular dimensions. Each translating system comprises a steering member, e.g. a rudder, an actuator, e.g. a reversible motor, for deflecting the steering member in opposite directions, a detector responsive to radiant energy, and a resolving circuit for converting the detector output into a signal for controlling the actuator in accordance with the bearing of the source of the detected energy relative to the bomb, in the dimension in which the system effects steering.

In accordance with one feature of this invention, the detector is receptive only to energy incident thereon within a prescribed range of angles and is moved, e.g. revolved, at a preassigned rate to scan the field in the dimension in which the respective translating system effects steering, and the resolving circuit is constructed and arranged to convert the detector output into an alternating current signal of frequency corresponding to the scanning rate and of phase, relative to the scanning sweep, determined by, and constituting a measure of, the bearing of the source of the detected energy with respect to the bomb.

In accordance with another feature of this invention, the resolving circuit includes also phase sensitive or time controlled rectifier means for converting the alternating current signal above mentioned into a direct current potential related in polarity and magnitude to the direction and angle respectively of the energy source with respect to the bomb, and means are provided for controlling the actuator for the steering member in accordance with the direct current potential.

In one specific embodiment of this invention, in a steering system for guiding a bomb to a target having a temperature different from that of the surrounding area, the detector comprises a polyhedric mirror and a highly sensitive bolometer element arranged to receive radiant heat reflected from the mirror, the latter being revolved to scan a prescribed area at a specified rate, and the bolometer is included in the input circuit of an amplifier selective to the frequency corresponding to the scanning rate. When the area scanned is of uniform temperature throughout, the resistance of the bolometer remains constant. If, however, an object of elevated temperature is within this area, the bolometer resistance varies to produce signal pulses of the frequency noted, each pulse occurring at a point in the respective scanning cycle determined by the position of the object, whereby the output of the amplifier is an alternating current signal of the frequency noted and of phase with respect to the scanning sweep determined by and a measure of the bearing of the object with respect to the bomb.

The invention and the above noted and other features thereof will be understood more clearly and fully from the following detailed description with reference to the accompanying drawing in which.

Figure 2:
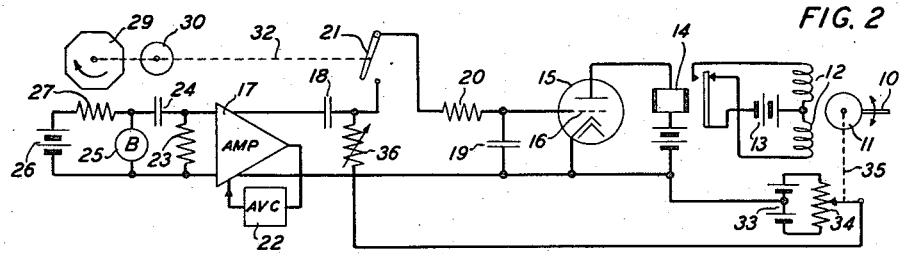
Fig. 2 is a circuit diagram of a steering system illustrative of one embodiment of this invention.

Referring now to the drawing, the steering system illustrated in Fig. 2 comprises a rudder 10 deflectable in opposite directions by a reversible motor 11 having a pair of field windings 12, the direction of rotation of the motor being determined by which of the windings 12 is energized. The windings 12 are arranged to be energized from a source, such as a battery 13, under control of a relay 14 included in the anode circuit of an electron discharge device 15. As is clear from Fig. 2, the position of the armature of the relay 14 determines which of the windings 12 is energized. The position of the armature is determined, in turn, by the potential of the control electrode or grid 16 of the device 15. For example, if the device 15 is biased at cut-off, when the signal potential upon the grid 16 is zero or negative, the relay armature will engage one of the relay contacts and when the signal potential is positive, the relay will be energized and the armature will engage the other of the contacts.

The electron discharge device 15 is connected to the output side of a low frequency amplifier 17, the input circuit for the device 15 including condensers 18 and 19, a resistor 20, and a switch 21 connected as shown. The switch is operated periodically, as described hereinafter. The amplifier 17 is provided with automatic volume control 22 to maintain the output level of the amplifier substantially constant over a wide range of inputs to the amplifier.

The input circuit for the amplifier 17 includes the input resistor 23, a blocking condenser 24 and a bolometer 25. The bolometer is characterized by the fact that its resistance varies sharply in accordance with infra-red radiation incident thereon, and is energized by a source, such as a battery 26, in series with a suitable resistor 27.

Figure 1:
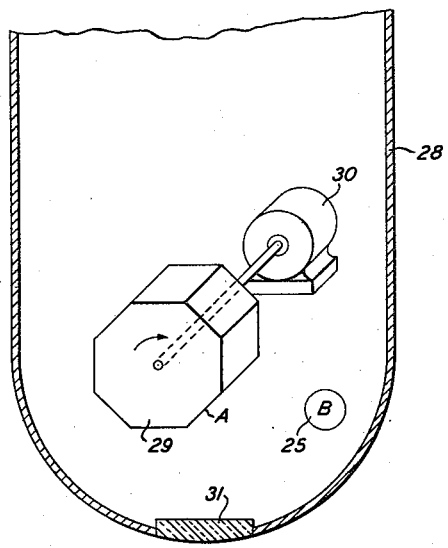
Fig. 1 is an elevational view partly in section of a portion of an aerial bomb, showing components of the energy detecting element of a steering system illustrative of one embodiment of this invention.

As illustrated in Fig. 1, the bolometer 25 is mounted within the casing 28 of a bomb, opposite a rotatable polyhedric mirror 29 and is so positioned relative to the mirror that infra-red rays incident within a preassigned range of angles, upon the face of the mirror having the position of the face A in Fig. 1 at any time, are reflected upon the bolometer 25. The mirror 29 is mounted within the casing 28 opposite a window 31 transparent to infra-red rays and aligned with the face A of the mirror.

The mirror 29 is rotated at a preassigned rate, for example to provide a scanning rate of 20 sweeps per second, by a motor 30. As indicated in Fig. 2, the motor 30 is associated with the switch 21 by a suitable coupling, indicated by the broken line 32, so that the switch is opened and closed at the scanning rate and in phase with the scanning cycle. For reasons which will appear presently, the amplifier 17 is made selective to the frequency corresponding to the scanning rate, e.g. 20 cycles for a scanning rate of 20 sweeps per second.

It will be seen that the angle, with respect to the longitudinal axis of the bomb casing 28, from which radiant energy must come to reach the bolometer via the window 31 and mirror 29 varies during the scanning cycle at a uniform rate. If the field swept by the mirror is of the same temperature throughout, the resistance of the bolometer will remain substantially constant. If, however, there is within this field an object, for example a ship or a furnace, the temperature of which is above that of the surrounding area, the energy received by the bolometer will increase to a maximum and then decrease at some time in the scanning cycle. Consequently, the resistance of the bolometer will vary accordingly and a series of pulses, at the frequency to which the amplifier 17 is selective, will be impressed upon the input circuit for the amplifier. The phase relation of these pulses with respect to the scanning sweep will be dependent upon the bearing of the object noted with respect to the window 31 and, hence, to the longitudinal axis of the bomb.

Figure 3:
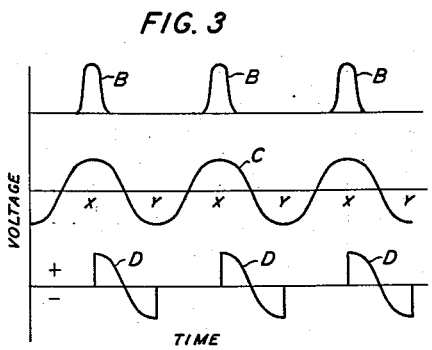
Figs. 3 and 4 are diagrams illustrating the relationship of the voltages at several points in the system shown in Fig. 2 when the bomb is on-course and off-course respectively, with respect to the target.
Figure 4:
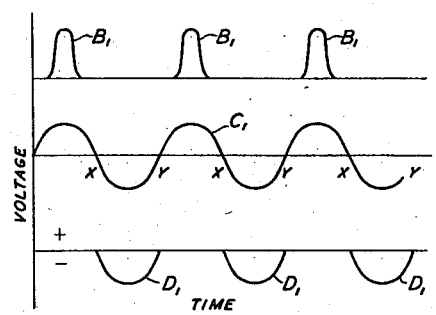

This will be apparent from the voltage-time graphs, Figs. 3 and 4, wherein the coordinates are time and voltage as indicated. In these figures, the points in time at which the switch 21 closes are marked $x$ and those at which the switch 21 opens are marked $y$. The scan occurs during and is equal to the time between two successive points $y$.

Fig. 3 illustrates the voltages and the phase relation thereof for the condition when the bomb is on course toward the object, i.e. the target. For this condition, the signal pulses due to variation in the resistance of the bolometer, supplied to the amplifier 17 are as indicated at B. Inasmuch as the bomb is on course, the target is aligned with the window 31 and, therefore, the signal pulses are in phase with the scanning sweep and each occurs at the center of a scanning cycle. Hence, the output voltage of the amplifier 17 is as shown by the curve C, i.e. a 20-cycle wave for the scanning rate specified hereinabove. Inasmuch as, as noted above, the switch 21 is operated in phase with the scan, the voltage, indicated by D, applied to the resistor 20 contains equal positive and negative portions so that no net direct current voltage is applied to the grid 16.

However, if the bomb is not on-course toward the target, the signal pulses due to the bolometer occur out of phase with the scanning sweep, i.e. before or after the center of the scan period. In an illustrative case, the signal pulses may occur a quarter cycle earlier as indicated by the graphs $B_1$ in Fig. 4 so that the output voltage of the amplifier 17 is a 20-cycle wave bearing the phase relation to the times $x$ and $y$ as shown by the curve $C_1$. Hence, the voltage applied to the grid 16 will be negative as indicated by $D_1$. Similarly, if the bearing of the target relative to the bomb is such that the signal pulses occur later than the center of the scan period, it is readily demonstrable that the voltage applied to the grid 16 will be positive.

Thus, to recapitulate, if the bomb is on-course toward the target, no signal voltage is applied to the grid 16 but if the bomb is off-course a corrective voltage is applied to this grid. The polarity of this voltage, as demonstrated hereinabove, is determined by the bearing of the target with respect to the bomb. Also, as will be apparent, the magnitude of this voltage is proportional to the off-course angle. Hence, and inasmuch as the amplifier 17 is provided with automatic volume control, the amplifier output is a signal of constant frequency, e.g. 20 cycles per second, and constant amplitude, the phase of which with respect to the scanning sweep is a measure of the bearing of the target relative to the bomb. This constant frequency, constant amplitude wave is converted by operation of the switch 21, which in effect produces rectification on a time basis, into a direct current control signal related in polarity to the off-course direction and proportional in magnitude to the off-course angle.

Inasmuch as the resolution of the energy received by the bolometer into a direct current control signal is predicated upon phase relationships, specifically that between the output of the amplifier 17 and the scanning sweep, it will be appreciated that any electrical phase shift introduced by the bolometer or the amplifier 17 must be compensated for. This may be accomplished by adjusting the coupling 32 to produce the same relative phase shift in the operation of the switch 21 as is produced by the bolometer and amplifier.

It will be understood, of course, that in order to obtain two-dimensional control of the bomb, that is, steering control in two mutually perpendicular directions, two systems such as illustrated in Fig. 2 are required, each system being effective to provide steering control in a corresponding one of the directions. In each system, the range of angles in the dimension in which this system is to control steering, for which radiant energy is accepted, should be relatively small for purposes of accuracy. However, in the other dimension the range of acceptance angle should be large. This may be realized in any particular construction by correlation of the width of the mirror, i.e., its dimension parallel to the axis about which it revolves, and the spacing between the mirror and the bolometer. That is to say, the mirror should be sufficiently wide to provide coverage over a large area in the other dimension noted and the bolometer should be sufficiently close to the mirror to provide the small acceptance range in the first dimension, the bolometer being provided with a suitable lens or reflector for proper focussing. Other ways of realizing the desiderata noted, for example by use of lenses or reflectors, may be employed.

Proportional steering, that is proportionality between amplitude of rudder deflection and off-course angle, may be obtained by the provision of a follow-up control such as illustrated in Fig. 2. As shown in this figure, a potentiometer including a source, such as a battery 33, and a resistance 34, the contact arm of which is coupled to the motor 11 or rudder 10 by a suitable coupling indicated by the broken line 35, is associated with the input circuit for the device 15. The polarity of the source 33 and direction of motion of the contact arm for the resistance 34 are correlated so that the potentiometer introduces in the grid circuit of the device 15 a direct current potential proportional to the magnitude of rudder deflection and of the polarity opposite that of the control signal due to energy received by the bolometer. The relative sensitivities of the follow-up and signal controls are adjustable by a resistor 36.

When the direct current voltage due to the potentiometer 33, 34 is equal to the direct current control signal due to resolution of the bolometer signal, the rudder will remain stationary or will hunt back and forth over a small angle about the position thereof requisite to maintain the bomb exactly on-course toward the target.

The invention has been described with particular reference to a system responsive to radiant heat. It may be utilized also in systems responsive to other forms of wave energy. For example, in a system responsive to sound, a microphone or hydrophone highly directional in one plane and poorly directional in a plane perpendicular to the first, could be utilized as a detector, the microphone or hydrophone being revolved for the purpose of scanning and the microphone or hydrophone output resolved by a system such as illustrated in Fig. 2 into a direct current control signal related in polarity and amplitude to the bearing of source of the sounds received.

Although a specific embodiment of the invention has been shown and described, it will be understood that it is but illustrative and that various modifications may be made therein without departing from the scope and spirit of this invention as defined in the appended claims.

What is claimed is:

1. A wave energy translating system comprising wave energy responsive means for repeatedly scanning a prescribed field at a preassigned frequency, means for resolving energy received by said responsive means from a wave energy source in said field into an alternating current signal of said frequency, of constant amplitude and of a phase relative to the scanning sweep dependent upon the bearing of said source with respect to said responsive means, means for resolving said alternating current signal into a direct current signal of polarity determined by said phase and of amplitude proportional to said bearing, and operating means controlled in accordance with said direct current signal.

2. A wave energy translating system comprising wave energy responsive means for repeatedly scanning a prescribed field at a preassigned frequency, means for resolving energy received by said responsive means from a wave energy source in said field into an alternating current signal of said frequency and of a phase relative to the scanning sweep dependent upon the bearing of said source with respect to said responsive means, means for converting said alternating current signal into a direct current signal of one polarity when said alternating current signal is of leading phase relative to said scanning sweep and of the opposite polarity when said alternating current signal is of lagging phase relative to said sweep, and operating means controlled in accordance with the polarity of said direct current signal.

3. A wave energy translating system comprising wave energy responsive means for repeatedly scanning a prescribed field at a preassigned frequency, an amplifier, means for resolving energy received by said responsive means from a source within said field into signal pulses of said frequency and of phase relative to the scanning cycle determined by the bearing of said source relative to said responsive means, means for controlling the input of said amplifier in accordance with said signal pulses, phase sensitive rectification means for converting the output of said amplifier into a direct current signal of polarity determined by said relative phase, and operating means controlled in accordance with the polarity of said direct current signal.

4. A wave energy translating system comprising wave energy responsive means for repeatedly scanning a prescribed field at a preassigned frequency, an amplifier, means for resolving energy received by said responsive means from a source within said field into signal pulses of said frequency and of phase relative to the scanning cycle determined by the bearing of said source relative to said responsive means, means for controlling the input of said amplifier in accordance with said signal pulses, operating means associated with the output circuit of said amplifier, and means for opening said output circuit at said frequency and in phase with said scanning cycle.

5. A wave energy translating system comprising wave energy responsive means for repeatedly scanning, in one direction and at a preassigned frequency, a field of limited extent in said direction, an amplifier selectively responsive to said frequency, means for resolving energy received by said responsive means from a source within said field into signal pulses of said frequency and of phase relative to the scanning cycle determined by the bearing of said source relative to said responsive means, means for resolving the output of said amplifier into a control signal of one polarity when said pulses are of such relative phase as to occur before the middle of the respective scanning cycle and of the opposite polarity when said pulses are of such relative phase as to occur after the middle of the respective scanning cycle, and operating means controlled in accordance with the polarity of said control signal.

6. A wave energy translating system comprising a mirror, means for rotating said mirror at a preassigned rate, whereby said mirror repeatedly scans a field at a preassigned frequency, a bolometer opposite said mirror and responsive to radiant energy reflected therefrom, an amplifier having an input circuit including said bolometer, and having an output circuit including an operating device operable in accordance with the polarity of signals supplied thereto, and means for opening said output circuit at said frequency and in phase with the scanning cycle of said mirror.

7. A wave energy translating system comprising a polyhedric mirror, a bolometer opposite said mirror and responsive to radiant energy reflected therefrom, means for rotating said mirror about its longitudinal axis to scan a field at a prescribed frequency, an amplifier selectively responsive to said frequency and having an input circuit including said bolometer, means for resolving the output of said amplifier into a direct current control signal of polarity dependent upon the phase relation between energy received by said bolometer and the scanning sweep, and operating means controlled in accordance with the polarity of said control signal.

8. A wave energy translating system comprising a polyhedric mirror, a bolometer opposite said mirror and responsive to radiant energy reflected therefrom, means for rotating said mirror about its longitudinal axis to scan a field at a prescribed frequency, an amplifier selectively responsive to said frequency and having an input circuit including said bolometer, means for rectifying the output of said amplifier on a time basis, at said frequency and in phase with the scanning sweep, to produce a control signal, and operating means controlled in accordance with said control signal.

9. A wave energy translating system comprising a polyhedric mirror, a bolometer opposite said mirror and responsive to radiant energy reflected therefrom, means for rotating said mirror about its longitudinal axis to scan a field at a prescribed frequency, an amplifier selectively responsive to said frequency and having an input circuit including said bolometer, and having an output circuit including a device operable in accordance with the polarity of signals applied thereto, and means controlled by said rotating means for opening said output circuit at said frequency and in phase with the scanning cycle of said mirror.

10. A steering system for an aerial bomb, comprising a steering member, means for actuating said member in accordance with the polarity of a control signal applied to said means, wave energy responsive means on said bomb for repeatedly scanning a field of prescribed extent at a preassigned frequency while the bomb is in flight, means for converting energy received by said scanning means from an object in said field into signal pulses of said frequency and of phase relative to the scanning cycle determined by the bearing of said object with respect to the bomb, and means for resolving said signal pulses into a control signal applied to said first means and of polarity dependent upon said relative phase.

References Cited in the file of this patent
UNITED STATES PATENTS 1,820,647    Brown _____ Aug. 25, 1931